(No Model.) 3 Sheets—Sheet 1.
E. BERNINGHAUS.
MACHINE FOR MAKING SLAT AND WIRE FABRIC.
No. 548,506. Patented Oct. 22, 1895.
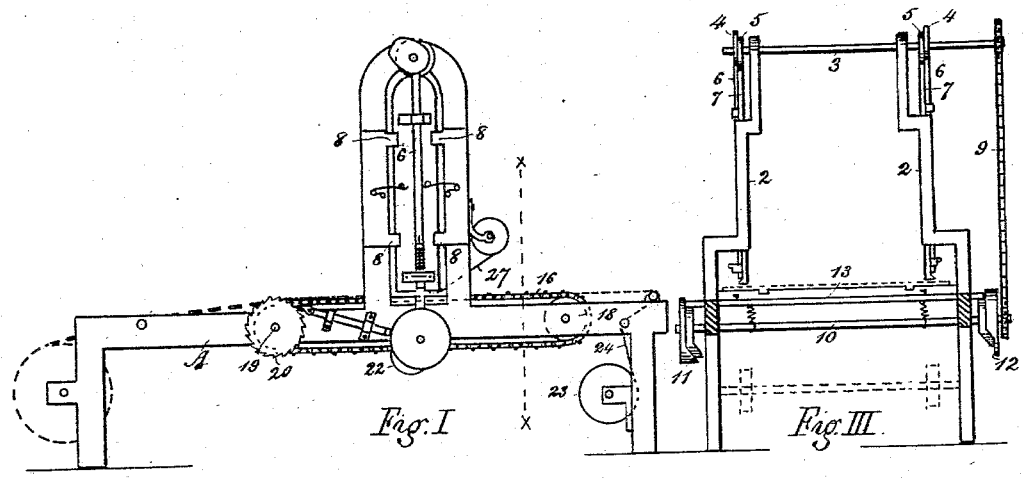
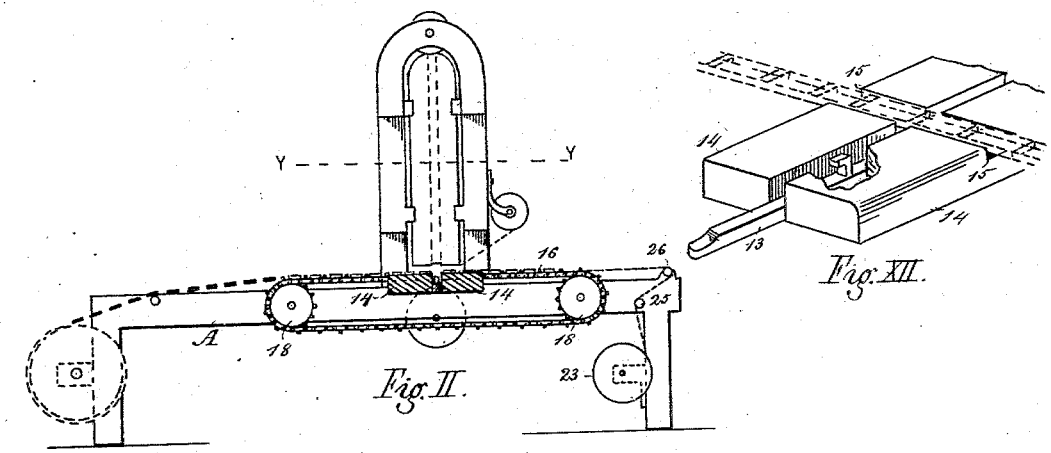
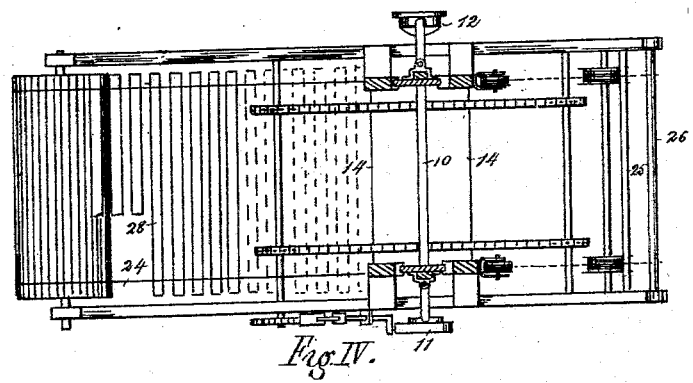
WITNESSES:
R. S. Millar
L. M. Adams
INVENTOR:
E. Berninghaus
BY
J. H. Bailey
ATTORNEY.

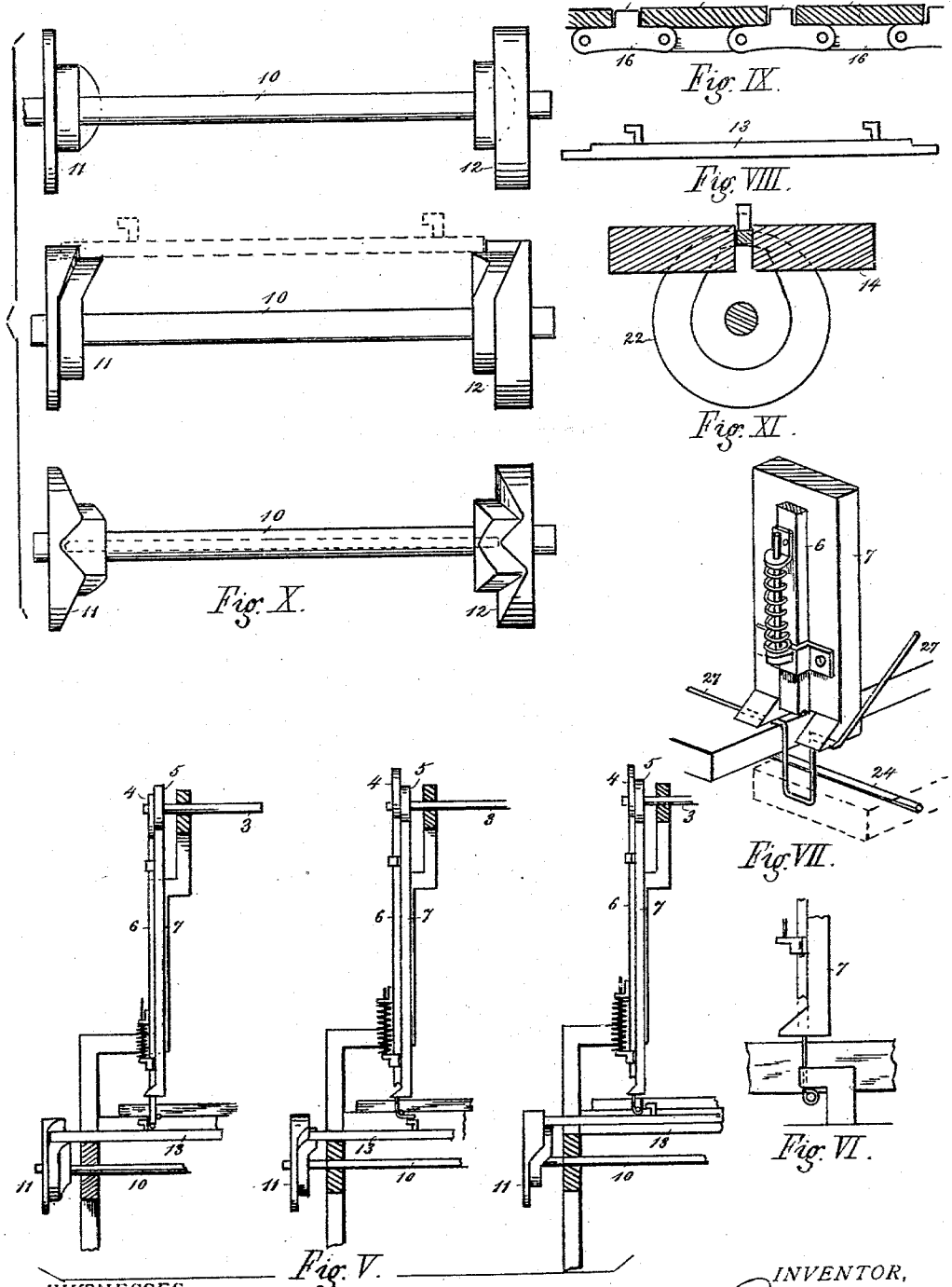

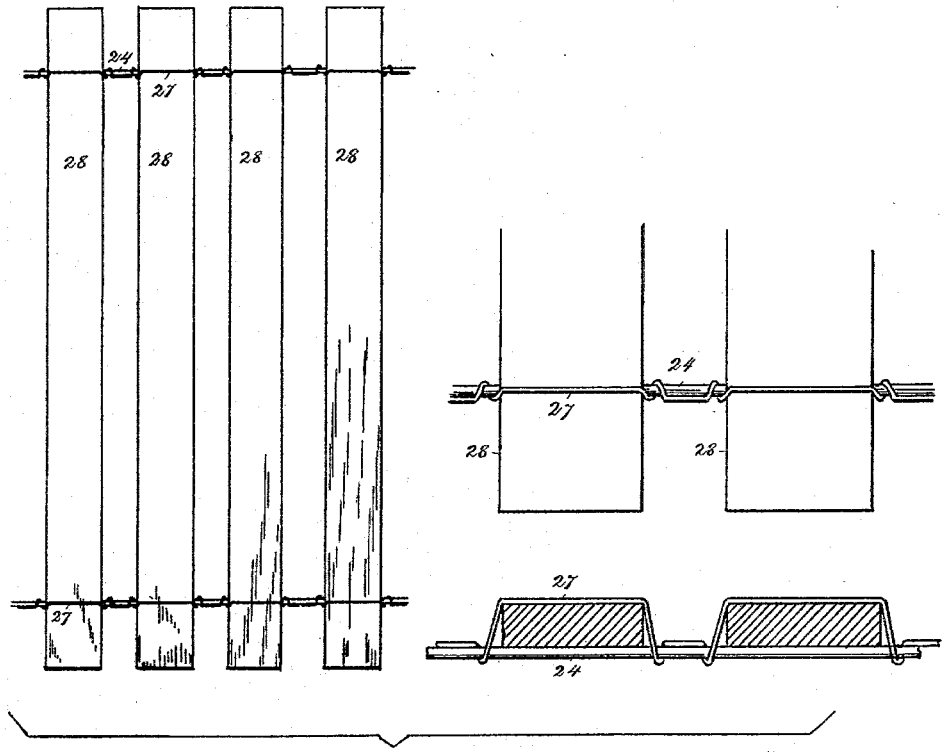
Fig. XIII.

UNITED STATES PATENT OFFICE.

EUGENE BERNINGHAUS, OF CINCINNATI, OHIO.

MACHINE FOR MAKING SLAT-AND-WIRE FABRIC.

SPECIFICATION forming part of Letters Patent No. 548,506, dated October 22, 1895.

Application filed November 23, 1894. Serial No. 529,722. (No model.)

*To all whom it may concern:*

Be it known that I, EUGENE BERNINGHAUS, a citizen of the United States, residing at Cincinnati, in the county of Hamilton and State of Ohio, have invented a new and useful Improvement in Machines for making Slat-and-Wire Fabric, which improvement is fully set forth in the following specification and accompanying drawings, in which—

Figure 1 represents a side elevation of my invention; Fig. 2, a central longitudinal section; Fig. 3, a transverse section in rear of line $x\ x$ in Fig. 1; Fig. 4, a plan section beneath line $y\ y$ in Fig. 2; Fig. 5, a portion of the plunger and loop-bending mechanism in successive stages of operation; Fig. 6, an enlarged detail showing the loop bent in final position; Fig. 7, a detail of the presser-foot and plunger after the formation of a loop in the transverse wire; Fig. 8, a detail view of the loop-bending bar; Fig. 9, the carrier-sprocket composed of links having vertical projections between which the slats are carried; Fig. 10, the compound cam-shaft in three positions of revolution; Fig. 11, the loop-bending plunger-bar elevated at its highest position on the supporting-cam; Fig. 12, the carrier-chain passing through the recesses of the transverse beams, and Fig. 13 detail views of the product of the machine.

The object of my invention is to construct a machine for the production of a fabric composed of slats and wire, forming an inexpensive and durable material which may be utilized with special advantage in the shape of crates for the transportation of fruit or other merchandise requiring packages which permit free ventilation.

The fabric consists of a warp composed of wire of suitable strength extending across the under side of the slats (during the process of construction) and smaller wires on the upper side, which are pressed downwardly between the slats by a plunger, forming depending loops which, by mechanism hereinafter described, are bent around the main wires and securely locked.

In the accompanying drawings, A designates the frame of the machine, provided with standards 2, in which are journaled a plunger-shaft 3, provided with cams 4 and 5, which operate plungers 6 and 7, the latter of which moves in guides 8 while the former is independently movable upon the outer face of the latter. A sprocket-belt 9 imparts motion to the transverse main shaft 10, on the ends of which are secured compound cams 11 and 12, which operate the loop-bending bar 13, provided with projections which engage the loops. This bar is loosely placed and held down by a spring in the interval between the beams 14, which have transverse recesses 15, which allow the slat-carrier chain 16 to pass flush with the top of said bars. The alternate links of this chain are formed with vertical projections 17, which determine the exact position or spacing of the slats. These carrier-chains run upon sprocket-pulleys 18, the rear shaft 19 being provided with a ratchet-wheel 20, actuated at predetermined intervals by a rod and pawl, which in turn are actuated by a cam 22 on the shaft 10. The main wire-reels 23 are suitably secured and the wire 24 passed up between the bars 25 and 26, in order to secure frictional tension. The lighter wires 27 are carried on spools which are journaled in lugs attached to the standards and the wire is led under the presser-foot, as shown in Fig. 7. The fabric when formed is wound upon a reel or otherwise disposed of as may be desired.

The operation of the device will now be described. A slat 28 being placed upon the carrier is moved forward one space by the action of the ratchet mechanism and halts under the rearward side of the presser-foot. At this juncture the loop-forming plunger, actuated by the cams 12, descends and forms the loop, as shown in Fig. 7. The presser-foot, being normally upheld by a spring, is now brought down by the cam upon the upper wire, forcing it into the surface of the slat. When the plunger is withdrawn the loop-bending bar 13, which normally lies in its recess, is moved back by the lateral face of the compound cams and its vertical projection catches the lower extremity of the loop and turns it horizontally beneath the main wire. Here the lateral cam passes and is immediately followed by the peripheral cam which raises the bar, bringing the loop extremity to a vertical position. The bar now resting upon the highest projection of the peripheral cam is next shot into the detent by the action of the projection on the opposite cam-wheel and is then immediately retired. The loop is now complete, as shown in Fig. 6. The bar then sinks and resumes its initial position within the recess, the presser-foot being meanwhile raised and the ratchet mechanism shifting another step for a repetition of the operation.

What I claim as new is—

The herein described machine for weaving a fabric composed of wires and slats, said machine comprising an endless sprocket slat carrier, the alternate links having vertical projections adapted to engage the slats which are shifted intermittingly and halted beneath plungers adapted to form loops in the smaller wires, said loops being subsequently bent around and locked upon the main wires by successive movements of a bar or shuttle provided with hooked vertical projections and actuated by a series of cams formed upon wheels mounted upon a revolving shaft driven by a sprocket belt from the main shaft, the latter being provided with cams for actuating the plunger mechanism, said plunger cams being relatively so adjusted as to produce a movement suitably correlated to the said loop bending and slat carrying mechanism, the latter embodying a ratchet bar actuated by a cam, substantially as and for the purposes herein described.

In testimony that I claim the foregoing I have hereunto set my hand, this 31st day of October, 1894, in the presence of witnesses.

EUGENE BERNINGHAUS.

Witnesses:
 WM. B. VAN SANDT,
 G. F. OSLER.